Oct. 13, 1959   J. C. LOVE ET AL   2,908,340
QUICKLY ATTACHABLE AND DETACHABLE CULTIVATOR SHOVEL
Filed Aug. 9, 1957
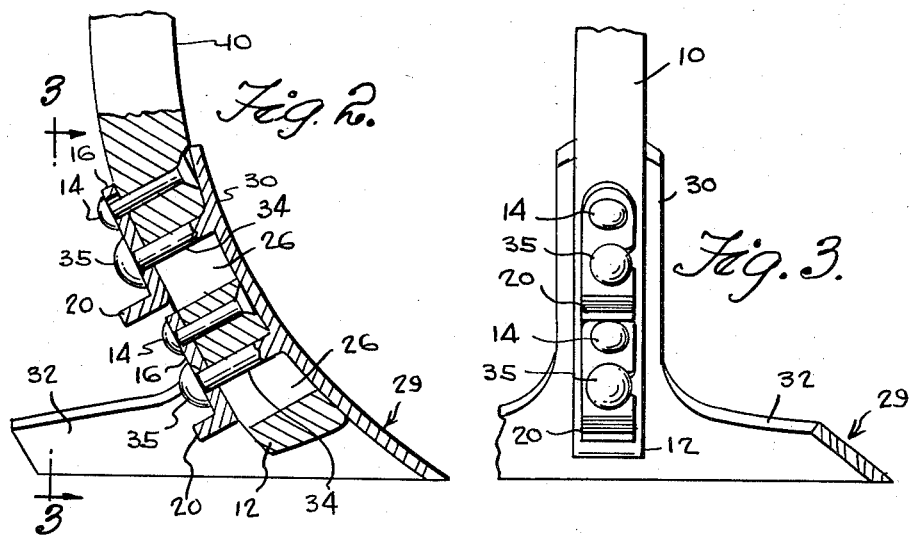
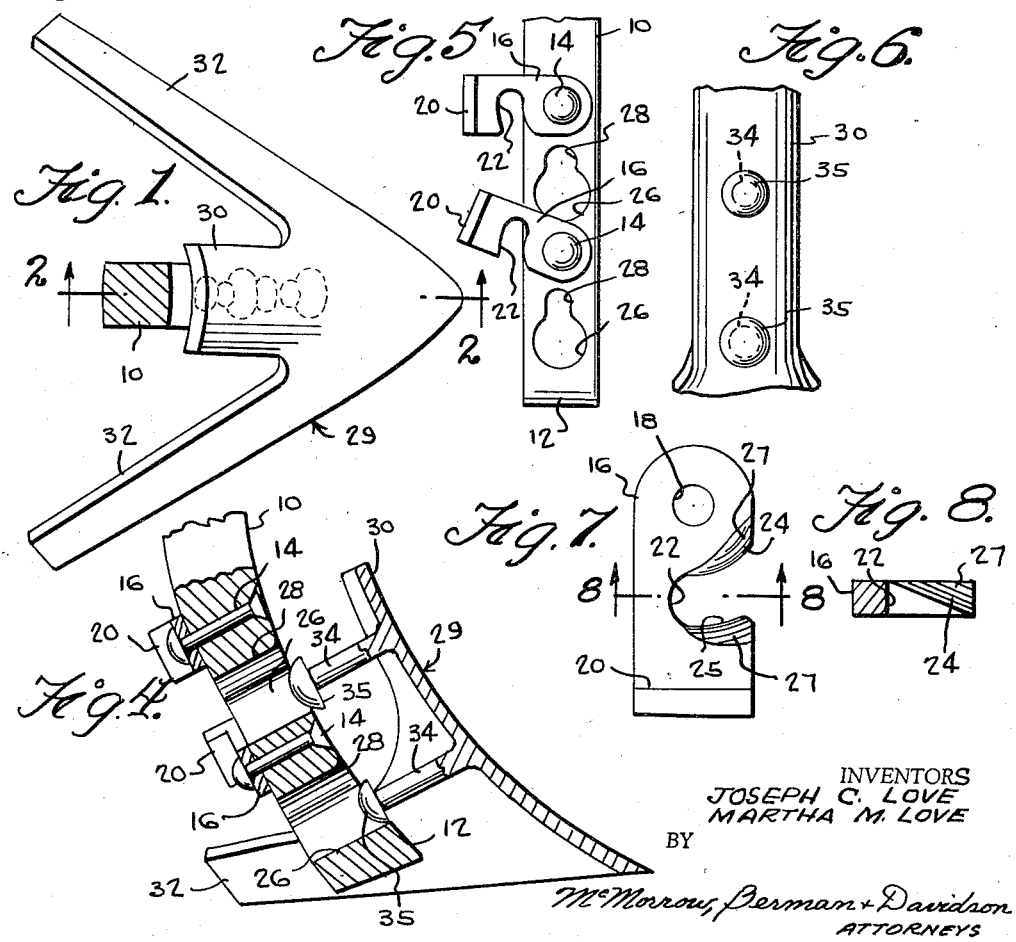
INVENTORS
JOSEPH C. LOVE
MARTHA M. LOVE
BY
McMorrow, Berman + Davidson
ATTORNEYS

2,908,340
QUICKLY ATTACHABLE AND DETACHABLE CULTIVATOR SHOVEL

Joseph C. Love and Martha M. Love, Conrad, Mont.

Application August 9, 1957, Serial No. 677,372

2 Claims. (Cl. 172—762)

This invention relates to the mountings of cultivator blades or shovels, and more particularly has reference to a device of this nature which is so designed as to facilitate the swift attachment of the shovel or blade to a cultivator shank or standard, with the invention being adapted to permit the demounting, with equal speed and ease, of the cultivator shovel.

An important object of the present invention is to provide improved means for attaching a shovel to a cultivator shank, which means will be designed to eliminate the bolts and nuts heretofore required.

Another object is to so design the attaching means as to permit the shovel to be secured to the standard merely by extension of rearwardly projecting, headed shanks of the shovel through keyhole slots, followed by slight longitudinal movement of the shovel along the length of the standard, with said movement then being followed by rotatable movement of locking arms into positions in which they lock the headed shanks within the keyhole slots.

A further object is to provide means for connecting the cultivator shovel to a standard which will be adapted for incorporation in generally conventional cultivator devices, with a minimum of modification and redesign thereof.

Another object is to insure that the connection, though particularly designed to permit the swift attachment or detachment of the shovel, will still be completely secure and will be designed to prevent the shovel from becoming loose while it is in use.

Other objects will appear from the following description, the claims appended thereto, and from the annexed drawing, in which like reference characters designate like parts throughout the several views, and wherein:

Figure 1 is a plan sectional view of a standard and cultivator shovel, with the shovel attached to said standard and being shown in top plan;

Figure 2 is a vertical sectional view through the standard and shovel, substantially on line 2—2 of Figure 1;

Figure 3 is a fragmentary rear elevational view of the shovel and standard, as seen from the line 3—3 of Figure 2;

Figure 4 is a view like Figure 2 in which the shovel has been partly detached from the standard;

Figure 5 is a rear elevational view of the lower portion of the standard with the locking arms in their released positions;

Figure 6 is a rear fragmentary elevational view of the shovel per se;

Figure 7 is an enlarged rear elevational view of one of the locking arms per se; and Figure 8 is a transverse sectional view, on the same scale as Figure 7, through the locking arm, taken substantially on line 8—8 of Figure 7.

Referring to the drawing in detail, the reference numeral 10 designates a conventional cultivator standard, having a lower end portion which curves forwardly in a downward direction as shown to particular advantage in Figures 2 and 4. Standard 10 is so formed that said lower end portion 12 thereof is curved correspondingly to and is in contact with the back face of a cultivator shovel, to be described in greater detail hereinafter.

Spaced longitudinally of standard 10 and extending transversely thereof from the front to the back surfaces of the standard are rivets or pins 14, the rear ends of which have heads spaced laterally outwardly a short distance from the rear surface of the lower end portion 12. Freely rotatable on the rearwardly projecting, headed ends of the pins 14 are locking arms 16, having rounded inner ends formed with openings 18 through which pins 14 extend, the heads of the pins overlying the inner end portions of the locking arms to permanently connect the same to the back surface of standard 10.

The locking arms are formed from short lengths of flat bar stock, and as shown in Figure 2, at their distal ends the locking arms have rearwardly outwardly projecting, transversely extending lips or flanges 20, for a purpose to be made apparent.

Intermediate their ends, the locking arms have laterally opening slots 22 curving about the pivot axes of the arms. Slots 22 at their inner ends are formed with approximately semicircular inner end edges, and the slots are also formed with side edges 24, 25 which are of beveled formation as shown in Figures 7 and 8, providing cam surfaces 27 on the outer face of the locking arm, said cam surfaces extending along the opposite sides of the slot. Cam surfaces 27 are increased progessively in width in a direction from the approximately semicircular inner end wall of slot 22, toward the outer end of the slot, again as best shown in Figure 7.

The beveling of the edges 24, 25 is in a direction such that the side walls of the slot are of minimum width at the outer ends of the slot, with said side walls being progressively increased in width in a direction toward the inner ends of the slot, until eventually the slopes of the cam surfaces are terminated at the inner end of the slot, leaving the inner end wall 22 of maximum thickness, that is, of the general thickness of the locking arm material.

Formed in the lower end portion 12 are keyhole slots or openings 26, having larger, lower ends merging into reduced or narrower upper end portions 28 (see Figure 5).

The respective keyhole slots 26 are disposed immediately below the pivot pins 14, as shown in Figure 5, in positions such that when the locking arms are swung from their Figure 5 to their Figure 3 positions, the slots 22 will be registered with the reduced end portions 28.

A cultivator shovel generally designated 29 has a curved, plate-like body or tongue 30 integral at its lower end with rearwardly divergent side wings 32 (Figure 1). Integral or otherwise made rigid with tongue 30 and projecting rearwardly from said tongue in positions spaced longitudinally of the tongue are attaching shanks or stems 34 headed at their rear, free ends as at 35.

In use of the device, heads 35 are registered with the larger ends of keyhole slots 26 as in Figure 4. Shovel 29 is then moved rearwardly so as to extend shanks 34 through the keyhole slots. When heads 35 are disposed rearwardly of keyhole slots 26, the shovel is moved upwardly to engage shanks 34 in the reduced portions 28. Locking arms 16 are then swung from their Figure 5 to their Figure 3 positions. Slots 22 will receive shanks 34 and since the slots 22 extend transversely of the keyhole slots, the shanks will be held against retrograde movement out of reduced portions 28.

When the locking arms are swung to locking positions, heads 35 will ride up on cam surfaces or slopes 27. In this connection, the heads 35 are initially spaced from the back surface of lower end portion 12 of standard 10 a distance slightly less than the maximum thickness of the locking arms. Therefore, resistance will be encountered by the locking arms, preventing their movement to full locking positions. One now utilizes a hammer or similar tool, striking flanges 20 which constitute enlargements for this purpose, forcing the locking arms to their full locking positions of Figures 2 and 3. Eventually, heads 35 come to rest upon the portion of the locking arm that is of maximum thickness, that is, the portion adjacent the inner end wall of the slot 22. When this happens, shanks 34 will be urged in the direction of their lengths, to the left in Figures 2 and 4, binding tongue 30 tightly against the front surface of lower end portion 12. The engagement of the locking arms under the heads 35 will be such as to cause a strong frictional engagement between the heads 35, the locking arms, lower end portions 12 and tongue 30. A fixed connection of the shovel to the standard is thus provided.

At the same time, the shovel can be swiftly detached, merely by striking the flanges 20 with a hammer, at the right side of the locking arms, viewing the same as in Figure 3, to swing the locking arms clockwise in Figure 3 out of engagement with locking pins 34 of the shovel.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a cultivator, an elongated standard having front, back, and side surfaces, the standard having a plurality of keyhole openings spaced longitudinally thereof, said openings extending through the full thickness of the standard and opening upon the front and back surfaces thereof; a plurality of locking arms, said locking arms corresponding in number to the openings and being pivotally connected at one end to the standard for swinging movement between locking and unlocking positions adjacent the respective openings, the back surface of the standard being flat and the locking arms swinging in planes parallel to the planes of the back surface of the standard in face-to-face contact with said back surface, the locking arms having slots opening laterally upon one side edge of the arms, each slot having its opposite edges formed as cam surfaces, the cam surfaces of each slot being oppositely sloped, both cam surfaces of a slot lying obliquely to said plane of the back surface and increasing in height in a direction away from the open end of the slot; a cultivator shovel including a tongue and side wings on one end of the tongue, said tongue being proportioned to overlie the front surface of the standard; and headed pins extending rearwardly from the tongue, the pins including shanks and heads on the shanks, the heads of the pins being movable through the larger ends of the keyhole openings and the shanks being snugly engageable in the smaller ends of said openings following passage of the heads through the larger ends of the openings and movement of the pins longitudinally of the openings into the smaller ends thereof, the slots registering with the smaller ends of the openings in the locking position of the arms so as to receive the shanks of the pins, the head of each pin being in engagement, at opposite sides of the shank thereof, with the cam surfaces of the slot, said slope of the cam surfaces being pitched in a direction to effect movement of the heads away from the back surface of the standard along paths in extension of the lengths of the pins, thus to bias the pins in the direction of their lengths perpendicularly to said plane of the back surface responsive to the swinging of the locking arms from their unlocking to their locking position, thereby to force the tongue into frictionally binding, face-to-face contact with the front surface of the standard.

2. In a cultivator, an elongated standard having front, back, and side surfaces, the standard having a plurality of keyhole openings spaced longitudinally thereof, said openings extending through the full thickness of the standard and opening upon the front and back surfaces thereof; a plurality of locking arms, said locking arms corresponding in number to the openings and being pivotally connected at one end to the standard for swinging movement between locking and unlocking positions adjacent the respective openings, the back surface of the standard being flat and the locking arms swinging in planes parallel to the planes of the back surface of the standard in face-to-face contact with said back surface, the locking arms having slots opening laterally upon one side edge of the arms, each slot having its opposite edges formed as cam surfaces, the cam surfaces of each slot being oppositely sloped, both cam surfaces of a slot lying obliquely to said plane of the back surface and increasing in height in a direction away from the open end of the slot; a cultivator shovel including a tongue and side wings on one end of the tongue, said tongue being proportioned to overlie the front surface of the standard; and headed pins extending rearwardly from the tongue, the pins including shanks and heads on the shanks, the heads of the pins being movable through the larger ends of the keyhole openings and the shanks being snugly engageable in the smaller ends of said openings following passage of the heads through the larger ends of the openings and movement of the pins longitudinally of the openings into the smaller ends thereof, the slots registering with the smaller ends of the openings in the locking position of the arms so as to receive the shanks of the pins, the head of each pin being in engagement, at opposite sides of the shank thereof, with the cam surfaces of the slot, said slope of the cam surfaces being pitched in a direction to effect movement of the heads away from the back surface of the standard along paths in extension of the lengths of the pins, thus to bias the pins in the direction of their lengths perpendicularly to said plane of the back surface responsive to swinging of the locking arms from their unlocking to their locking position, thereby to force the tongue into frictionally binding, face-to-face contact with the front surface of the standard, the cam surfaces of each slot extending fully from the open end of the slot to the inner end thereof, said cam surfaces declining progressively from the inner end to the open end of their associated slots, the slopes of the cam surfaces at the open ends of the slot terminating substantially in the plane of the face of the locking arm that is in contact with the back surface of the standard, the slope of the cam surfaces at the inner ends of the slots terminating in the plane of the opposite face of the locking arms, whereby to engage the heads of the pins responsive to swinging movement of the locking arms toward their locking positions, and bias said heads onto the second named faces of the locking arms in the full locking positions of the arms.

References Cited in the file of this patent

UNITED STATES PATENTS

| | | |
|---|---|---|
| 561,866 | Coles | June 9, 1896 |
| 1,273,621 | Kirkpatrick | July 23, 1918 |
| 1,274,815 | Techmer | Aug. 6, 1918 |
| 1,359,663 | Boda | Nov. 23, 1920 |
| 2,595,353 | Graham | May 6, 1952 |